P. R. OWENS.
ELECTRIC CONTROL SYSTEM.
APPLICATION FILED AUG. 3, 1918.
1,350,382.
Patented Aug. 24, 1920.
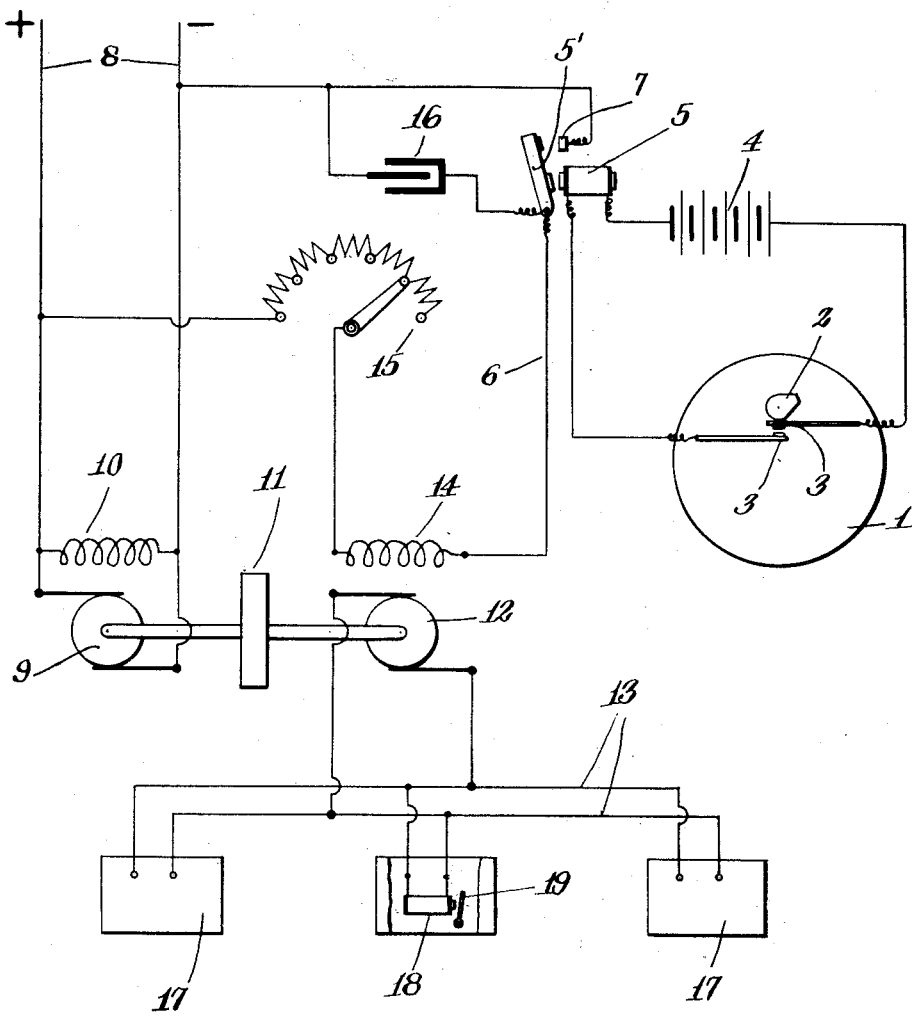
INVENTOR
Percy R. Owens
BY
ATTORNEY

UNITED STATES PATENT OFFICE.

PERCY R. OWENS, OF MOUNT KISCO, NEW YORK.

ELECTRIC CONTROL SYSTEM.

1,350,382.   Specification of Letters Patent.   Patented Aug. 24, 1920.

Application filed August 3, 1918. Serial No. 248,180.

*To all whom it may concern:*

Be it known that I, PERCY R. OWENS, a citizen of the United States, residing at Mount Kisco, in the county of Westchester and State of New York, have invented certain new and useful Improvements in Electric Control Systems, of which the following is a specification.

My invention relates to systems for controlling and operating time-stamps, secondary clocks, and other devices which are located at various points and are synchronized by a master-clock, or are otherwise actuated or controlled in unison by recurring electrical impulses. Time-stamps and the like are commonly operated by making and breaking, by means of a relay, the current supplied to their operating circuit, the impulses thus produced, under the control of a master-clock, serving to energize operating devices, such as magnets, at the different elements to be controlled. The amount of energy to be supplied to the circuit varies, in such a system, in proportion to the number of mechanisms to be controlled, and may become heavy enough to cause serious trouble. It has accordingly sometimes been found necessary to split up the system into several different circuits, each having a separate relay.

Such systems have been proposed to operate both on direct and alternating current; with the latter, however, there are inherent difficulties in connection with the magnets employed. When a circuit contains inductance a considerable rise of voltage is caused at each breaking of the circuit, and this is likely to cause burning of the contacts, and also necessitates highly insulating the circuit. In any case, the repeated breaking of a relatively high energy in a circuit is likely to cause trouble at the contacts.

The chief objects of my invention are to obviate the necessity of breaking relatively high energy for the operation of such systems, and to provide an even rise and fall of potential in the operating circuit, which will at no time exceed a safe amount. I obtain these results by operating a direct current generator, the field of which is separately excited, and is energized and de-energized at desired times, when operative impulses are to be created in the operating circuit of the time-stamps or other devices to be controlled, the armature of the generator being connected directly to the stamp-operating circuit. Thus, a motor-generator set with fly-wheel may be used, and kept operating continuously, the motor being connected to a suitable source and the generator field circuit being interrupted and closed at desired times, as by a master relay under the control of a master-clock. In such a system, the amount of energy actually interrupted in the field of the generator should be less than five per cent. of the total energy consumed in the system, and the rise and fall of potential in the stamp-operating circuit will be even and regular, at no time exceeding the normal voltage supplied by the generator.

In order that my invention may be more clearly understood, attention is hereby directed to the accompanying drawing, forming part of this application and illustrating one form of my invention. In the drawing, the figure represents, diagrammatically, apparatus and connections embodying my invention.

Referring to the drawing, a master-clock is indicated at 1, in the operation of which a cam 2 or the like is operated at desired intervals, such as once every minute or every thirty seconds, to close the contacts 3, 3. These are included in a local circuit which includes a suitable source of current, such as the battery 4, and the coil of a relay 5, which may be termed the master relay. The energization of the relay attracts its armature $5^1$ to close a circuit 6 through the armature and a contact 7, which circuit is connected across the main power leads 8, 8, or is otherwise connected to a suitable source.

I preferably make use of a motor-generator set of the fly-wheel type, comprising a shunt-wound motor and a direct-current generator with a separately excited field, the set being kept operating continuously. The motor armature is shown at 9 and its field at 10, both connected across the main leads 8, 8, and the fly-wheel on the motor-shaft is shown at 11. The armature 12 of the generator is shown as connected directly across the operating circuit 13 of the time-stamps or other devices to be operated or synchronized. The field 14 of the generator is included in the circuit 6 which is closed across the leads 8 when relay 5 is energized, this circuit preferably including a field rheostat 15, connected in series with the generator field to permit of regulation. A condenser 16 may be connected across the contacts of relay 5 to prevent flashing and burning of the contacts.

The devices to be operated, such as time-stamps, are indicated at 17. Each of these includes an operating mechanism, such as the magnet 18, connected for operation in any desired way to the circuit 13. As shown, the magnets 18 are all connected in parallel across the circuit 13. The armatures of the magnets, such as 19, may be connected in usual manner to operate the numbered wheels of time-stamps, so that these wheels will revolve in synchronism with the master-clock, it not being deemed essential to illustrate these well-known mechanisms.

The operation of my system will now be clear. The relay 5 is energized momentarily each rotation of cam 2 of the master-clock, to close circuit 6 and send an exciting current through the generator field 14, and to cause the generator armature to send an operating pulsation through circuit 13. The rheostat 15 in series with the generator field is for the purpose of regulating the amounts of current supplied to circuit 13 by the generator each time circuit 6 is closed. The rise of potential in circuit 13, to operate magnets 18 each time armature $5^1$ closes on contact 7, may be regulated so that it will always be moderate, not in excess of the normal voltage supplied by the generator, and the rise and fall of voltage in circuit 13 will be regular and even. The necessity of interrupting relatively high energy for the operation of the system is obviated, since the amount of energy required for exciting the generator field 14, and interrupted when armature $5^1$ breaks contact, should be less than five per cent. of the total energy consumed in the system.

It should be understood that while my invention relates particularly to the operation of time-stamps, electric clocks and the like, it may be applied to other uses within a considerable range. Also, that the invention is not limited to the particular construction illustrated, in which the relay 5 is used, in a local circuit with a battery, which circuit is controlled by the master-clock. It is only essential that some arrangement be made, such that the exciting circuit of the generator field will be interrupted by or under the control of a timed element of the master-clock, or, generally speaking, at desired times or intervals. It should also be noted that, with the use of the type of motor-generator set described, the function of the fly-wheel 11 is to store energy during the intervals between the actuations of devices 17, when the generator field 14 is dead, which energy will be drawn upon during the times the generator field is excited and a greater voltage is being supplied by the generator.

Having now described my invention, what I claim as new therein and desire to secure by Letters Patent is as follows:—

1. In an electric control system, the combination of a plurality of devices to be actuated, a circuit to which said devices are connected, a generator connected to supply current to said circuit, having a separately excited field, means for continuously rotating the armature of said generator, a power circuit for said generator field, adapted to be closed and opened, and means for making and breaking said last-named circuit at desired intervals.

2. In an electric control system, the combination of a plurality of devices to be actuated, a circuit to which said devices are connected, a generator connected to supply current to said circuit, having a separately excited field, means for continuously rotating the armature of said generator, a power circuit for said generator field, adapted to be closed and opened, a master-clock, and means under the control of said clock for making and breaking said last-named circuit at timed intervals, to cause actuating impulses to be delivered to said devices.

3. In an electric control system, the combination of a plurality of devices to be actuated, a generator having a separately excited field and an armature connected to transmit actuating impulses to said devices when its field is momentarily excited, means for continuously rotating said armature, a circuit including said field and an electrical source, adapted to be closed and opened, and means for momentarily making and then breaking said circuit at desired times.

4. In an electric control system, the combination of a plurality of devices to be actuated, a source of power, a motor-generator set, the motor of which is connected to said source for operation, and the generator of which has a field, the exciting circuit of which includes said source and a pair of normally-open contacts, the armature of said generator being connected to transmit actuating impulses to said devices when its field is excited, and means for making and breaking said circuit at desired times.

5. In an electric control system, the combination of a master-clock, a relay, means for energizing said relay to attract the armature thereof at timed intervals under the control of said clock, a plurality of devices to be actuated at the same intervals, a generator having its armature connected to transmit actuating impulses to said devices when its field is momentarily excited, means for rotating said generator armature, an electrical source, and a normally open circuit including said field and source, adapted to be closed when said relay attracts its armature.

This specification signed and witnessed this 30th day of July, 1918.

PERCY R. OWENS.

Witnesses:
DYER SMITH,
I. McINTOSH.